United States Patent [19]

Overby

[11] Patent Number: 5,030,262

[45] Date of Patent: * Jul. 9, 1991

[54] AIR VAPOR TRAP AND DRAIN THEREFORE

[75] Inventor: Kenneth W. Overby, Hamilton, Ind.

[73] Assignee: La-Man Corporation, Hamilton, Ind.

[*] Notice: The portion of the term of this patent subsequent to Oct. 17, 2006 has been disclaimed.

[21] Appl. No.: 402,809

[22] Filed: Sep. 5, 1989

Related U.S. Application Data

[63] Continuation of Ser. No. 188,638, May 2, 1988, Pat. No. 4,874,408, which is a continuation of Ser. No. 115,416, Nov. 2, 1987, abandoned.

[51] Int. Cl.$^5$ ............................................. B01D 50/00
[52] U.S. Cl. ........................................ 55/431; 55/466; 137/205; 417/148
[58] Field of Search .................. 417/148; 137/205; 55/321-323, 431, 424-426, 218, 219, 466

[56] References Cited

U.S. PATENT DOCUMENTS

| | | | |
|---|---|---|---|
| 426,880 | 4/1890 | Taylor | 55/219 |
| 756,942 | 4/1904 | Duck | 55/423 |
| 2,638,218 | 5/1953 | Simpson et al. | 209/144 |
| 4,600,416 | 7/1986 | Mann | 55/423 |
| 4,848,989 | 7/1989 | Maeda | 55/323 |
| 4,874,408 | 10/1989 | Overby | 55/218 |
| 4,897,094 | 1/1990 | Maeda | 55/323 |

FOREIGN PATENT DOCUMENTS

1146262  3/1969  United Kingdom ................. 55/431

Primary Examiner—Bernard Nozick
Attorney, Agent, or Firm—Barnes & Thornburg

[57] ABSTRACT

An in-line vapor trap for removing water and/or oil vapor from a compressed air line which includes a manifold having spaced coaxial inlet and outlet openings, a hollow base suspended from the manifold, and replaceable cartridges connecting the manifold inlet to the hollow base and connecting the hollow base to the manifold outlet. A honeycomb structure is disposed in the lower portion of the base within the enclosed volume defined thereby, and cooperates with the base side and bottom walls to define a zone of substantially zero air movement for collection of liquid droplets. A depression in the base bottom wall forms a liquid sump, and a drain opens into the sump for drainage of captured liquid. This drain features an enclosed bowl suspended by a hollow fitting beneath the sump, and an aspiration tube which extends from within the bowl through the fitting and sump to adjacent the exit from the hollow base, such that air is circulated from within the base through the fitting into the bowl and then aspirated therefrom through the tube. Liquid collected in the sump is drawn by such air circulation into the bowl.

8 Claims, 1 Drawing Sheet

TO COLLECTION TANK

TO COLLECTION TANK

AIR VAPOR TRAP AND DRAIN THEREFORE

This is a continuation of application Ser. No. 07/188,638, filed May 2, 1988, now U.S. Pat. No. 4,874,408, issued Oct. 17, 1989, which is a file wrapper continuation of 07/115/416, filed Nov. 2, 1987, now abandoned.

The present invention is directed to devices of a type adapted to remove oil and/or water vapor from a flowing gaseous medium such as compressed air, and more particularly to improved drainage of devices of this character.

U.S. Pat. No. 4,487,618 assigned to the assignee hereof discloses an in-line trap for removing water and/or oil vapor from a compressed air line which includes a manifold having spaced coaxial inlet and outlet openings and a hollow base suspended from the manifold. A first cartridge extends between the manifold inlet and the enclosed volume within the hollow base, and contains a wire pad adapted to coalesce water and/or oil vapor in air passing therethrough into droplets which are then entrained by the air and carried into the base volume. An integral honeycomb structure cooperates with the bottom and side walls of the base to form a dead airspace which captures water droplets falling from air entering the enclosed volume from the first cartridge. A second cartridge, which includes spirally wound fiber and wire mesh materials, directs compressed air from within the enclosed base volume to the manifold outlet and simultaneously functions to remove any remaining vapor therefrom.

In a commercial embodiment of the device disclosed in the referenced patent marketed by applicant's assignee under the trademark EXTRACTOR, a depression in the bottom wall of the base forms a liquid sump for collection of water and/or oil removed from the compressed air. A conventional drain mechanism, including a T-shaped draincock, is mounted in the base wall depression for selectively draining liquid collected therein. U.S. Pat. No. 4,600,416 discloses an improvement upon such commercial device in which the drain features an open annular orifice for continuous weep-drainage of liquid under pressure. The orifice surrounds a wire having an angulated head disposed within the sump. The wire may be rotated by an operator so as to remove dirt and debris from surrounding and clogging the annular weep orifice.

Although the devices hereinabove described have enjoyed substantial commercial acceptance and success, improvements remain desirable. In particular, the continuously-open weep drain causes a significant and undesirable loss of air pressure. Furthermore, liquid ejected from the trap puddles or pools beneath the weep drain, which is often undesirable in a manufacturing environment. It is therefore a general object of the present invention to provide an air line vapor trap of the described character which features an improved drain structure for continuously and automatically draining liquid collected in the trap sump without substantially reducing pressure in the main air line and without spraying the liquid into the surrounding environment.

In accordance with the present invention, an air line vapor trap of the described type is characterized in that a second enclosure is suspended by an open fitting beneath the drain sump, and a hollow tube extends from within the second enclosure through the fitting and sump to the entrance to the second cartridge. Air is thus aspirated through the tube from within the second enclosure so as to draw liquid from the sump through the fitting into the second enclosure. In a preferred embodiment of the present invention, the tube is carried by a collar mounted within the second enclosure beneath the fitting and communicates with a central opening in such collar. An array of drain openings surround the central opening in the collar, and an axially and radially flared skirt surrounds the central opening and is positioned beneath the array of drain openings. Liquid drawn through the drain array into the second enclosure thus impinges upon and drips from the skirt, and is not reaspirated through the central opening and tube into the trap. A float drain or the like is carried at the lower portion of the second enclosure for periodically draining liquid collected therein to a suitable collection tank or the like.

The invention, together with additional objects, features and advantages thereof, will be best understood from the following description, the appended claims and the accompanying drawing in which:

Figure 1:
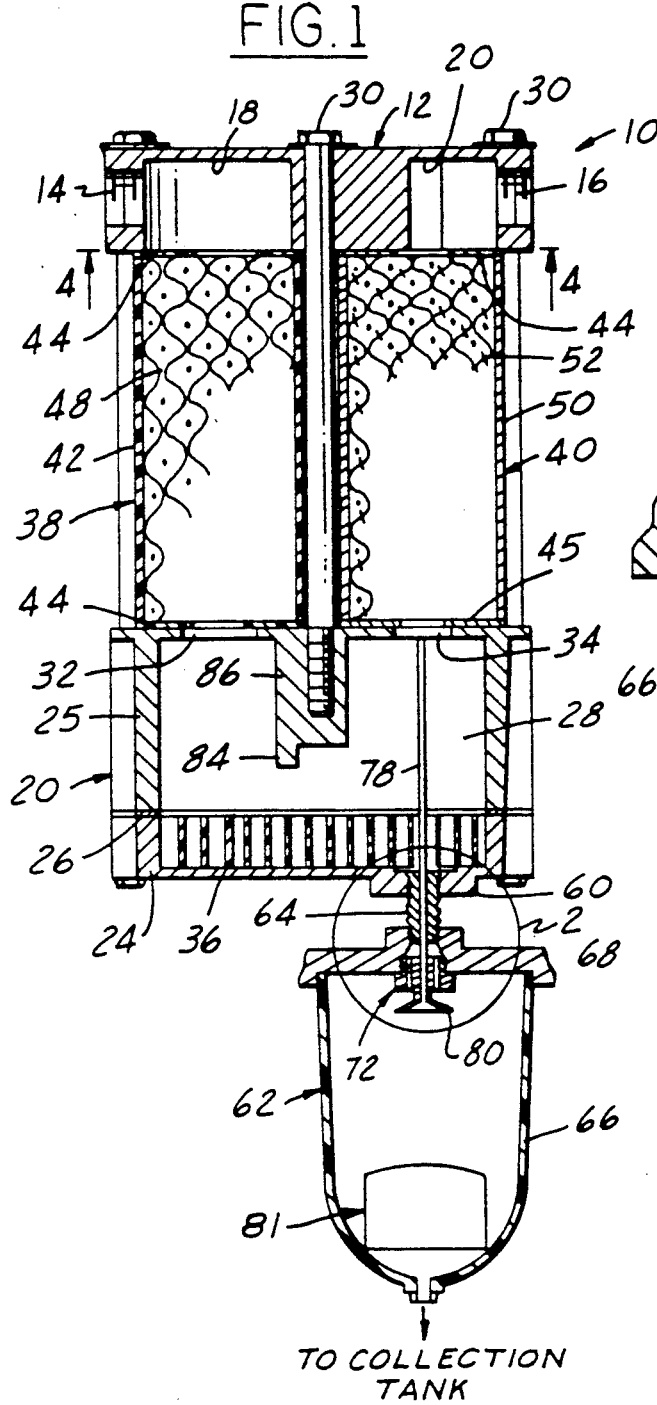
FIG. 1 is an elevational bisectional view taken in a vertical plane through the vapor trap in accordance with a presently preferred embodiment of the invention.
Figure 2:
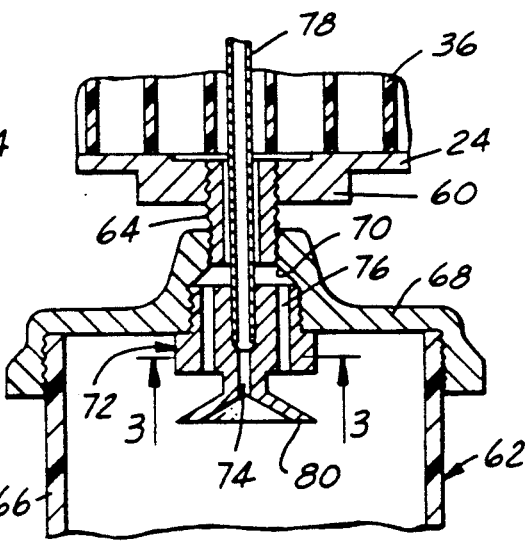
FIG. 2 is a fragmentary view of the trap in FIG. 1 featuring a portion of the drain mechanism on an enlarged scale.
Figure 3:
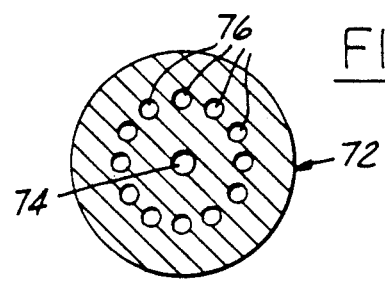
Figure 4:
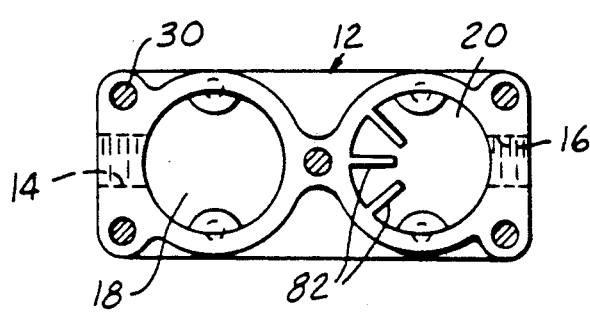
Figure 5:
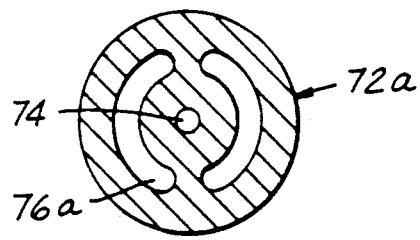

FIGS. 3 and 4 are sectional views taken substantially along the respective lines 3—3 and 4—4 in FIGS. 2 and 1; and FIG. 5 is a view similar to that of FIG. 3 but illustrating a modified embodiment of the invention.

The disclosures of above-noted U.S. Pat. Nos. 4,487,618 and 4,600,416 are incorporated herein by reference.

FIG. 1 illustrates a presently preferred embodiment 10 of a vapor trap in accordance with the invention as comprising a cap or manifold 12 having oppositely directed and coaxially aligned internally threaded openings 14,16 respectively defining an inlet and outlet adapted for inline connection to a gas line such as a compressed air line. A concave internal surface 18 on manifold 12 internally opposed to inlet opening 14 directs inlet air orthogonally of the inlet axis, or downwardly in the orientation of FIG. 1. In the same manner, a concave surface 20 opposed to outlet opening 16 receives and directs upwardly flowing air to outlet opening 16. A hollow base 22 of generally rectangular construction comprises a bottom wall plate 24 and a continuous sidewall 25 peripherally contiguous with bottom wall plate 24 and separated therefrom by the gasket 26. Base 22 thus forms an enclosed volume 28 suspended beneath and fastened to manifold 12 by the bolts 30. A pair of laterally spaced circular openings 32,34 are formed in base 22 in respective alignment in assembly with the inlet and outlet of manifold 12. An integral honeycomb structure 36 is disposed in the lower portion of enclosed volume 28 adjacent to bottom wall plate 24 and cooperates with the side and bottom walls of enclosure 22 to define a zone of substantially zero air movement adjacent to the enclosure bottom wall.

A pair of laterally spaced replaceable vaporizer cartridges 38,40 are clamped by bolts 30 between manifold 12 and base 22 in sealing engagement therewith. Cartridge 38, which is clamped in axial alignment between the inlet section of manifold 12 and opening 32 in base 22, comprises a cylindrical cartridge case 42 and an axially spaced pair of open end gaskets 44 clamped in sealing engagement with manifold 12 and base 22 respectively. Within case 42, cartridge 38 comprises a mass or pad 48 of wire mesh fibers of a type adapted to coalesce water or oil vapor passing therethrough into vapor droplets. Pad 48 in the preferred embodiment of the invention comprises a so-called "Goodloe column packing" of a type disclosed in U.S. Pat. No. 2,521,785. The dimension of cartridge 38 cross-sectional to air flow is substantially less than that of the enclosed volume 28 within base 22. Cartridge 40, which is clamped in axial alignment between the outlet portion of manifold 12 and base opening 34, comprises an outer cylindrical case 50 and a pair of end gaskets 44,45 in respective sealing engagement with manifold 12 and base 22. Within cartridge case 50 and between end gaskets 44,45, and filling the entire cartridge volume, is a plug structure 52 of absorbent fabric interwoven with strengthening wire threads.

In operation of trap 10, which is similar in most important respects to that disclosed in U.S. Pat. No. 4,487,618 to the extent thus far described, air with entrained water and/or oil vapor is received through inlet opening 14 and directed by surface 18 downwardly into and through cartridge pad 48. During such passage through pad 48, the water and/or oil vapors are coalesced into droplets which are entrained in the flowing air mass and carried thereby into the open volume 28 within base 22. Since the crosssectional dimension to air flow within volume 28 is greater than that within cartridge 38, the velocity of air entering the open base is reduced, and the entrained droplets fall by gravity and centrifugal force toward the lower portion of the base. Such droplets are captured within the essentially dead airspace formed by honeycomb structure 36. Since the construction of honeycomb structure 36 prevents substantial air movement therewithin, revaporization is substantially eliminated. In the meantime, the compressed air stream, which is now 75% to 95% dry, is fed from enclosed volume 28 through opening 34 into cartridge 40. As the air passes upwardly through the fiber/mesh plug 52 toward outlet 16, any remaining vapor is removed by the fibrous plug material. A depression 60 is formed in bottom wall plate 24, beneath honeycomb structure 36 and the dead air space provided thereby, to serve as a sump for liquid removed from the compressed air stream.

In accordance with the present invention, sump 60 is positioned beneath opening 34 coaxially therewith. An enclosure 62 is suspended from sump 60 by the hollow fitting 64 which is threadably received into a corresponding opening in sump 60. Enclosure 62 comprises a bowl 66 having an open edge suspended from the periphery of an enclosure top 68. Top 68 has a central opening 70 into which the lower end fitting 64 is threadably received. Opening 70 is outwardly and downwardly flared, as best seen in FIG. 2, and has a collar 72 threadably received therein from within enclosure 62 coaxially with fitting 64. Collar 72 has a circular central passage 74, and has a circumferential array of passages 76 extending axially therethrough surrounding central passage 74. A rigid tube 78 is press-fitted into a counterbore in central passage 74 and extends upwardly through opening 70, fitting 64, sump 60 and honeycomb 36 to terminate at opening 34 (FIG. 1) coaxially therewith. A conical skirt 80 integrally depends from collar 72 surrounding central opening 74 and flares axially and radially therefrom beneath passages 76.

In operation, air flowing from within enclosed volume 28 through opening 34 to cartridge 40 exhibits increase in velocity due to decrease in effective cross-sectional area. In this respect, it will be noted in FIG. 1 that the air-passage opening 34 and the central opening in gasket 45 are smaller than opening 32 and the corresponding passage in gaskets 44 in order to enhance such velocity increase. Air is aspirated upwardly through tube 28 and central passage 74, which thus draws a small amount of air from within volume 28 through fitting 64 surrounding tube 78 and through openings 76 into enclosure 62. Such air flow through fitting 64 draws liquid from sump 60 through opening 70 and through openings 76 in collar 72. Such liquid impinges upon and drips from skirt 80, which thus prevents flow of liquid along collar 72 and re-aspiration through tube 78. A float drain or other conventional device 81 is positioned at the lower end of bowl 66 for periodically draining liquid therefrom into a suitable collection tank or the like (not shown).

FIG. 5 illustrates a modified collar 72a wherein the multiplicity of circular opening 76 in the embodiment of FIG. 3 are replaced by a pair of kidney-shaped openings 76a extending at constant radius around central opening 74. FIG. 4 illustrates an improvement in manifold 12 whereby ribs 82 extend from surface 20 and thus help support gasket 44 against pressure surges in air passing through the vapor trap. FIG. 1 also illustrates a further improvement in the prior art traps hereinabove described whereby a baffle 84 projects downwardly from the central boss 86 within enclosed volume 28 for promoting downward circulation of air toward honeycomb 36.

The invention claimed is:

1. In a trap for removing vapor from a compressed air line, the trap comprising:
   (a) a manifold having inlet means for coupling to the compressed air line to direct compressed air from the compressed air line into the trap and outlet means for coupling to the compressed air line to direct filtered compressed air back into the compressed air line;
   (b) filter means including a housing means for promoting coalescence of vapor entrained in compressed air flowing through the filter means into liquid, the filter housing means coupled between the inlet and outlet mans of the manifold and in fluid communication therewith;
   (c) means for defining a first enclosed volume beneath the filter means which is fluidly coupled to the filter means so that the liquid coalesced by the filter means flows into the first enclosed volume and wherein there is means to produce a pressure drop across the first enclosed volume;
   (d) a drain port opening into the first enclosed volume;
   e) drain means for draining liquid collected in the first enclosed volume, the drain means having means for defining a second enclosed volume;
   (f) means for fluidly coupling the second enclosed volume to the first enclosed volume at the drain port, the improvement comprising:
   (g) an aspirator tube extending from the second enclosed volume into the first enclosed volume, said aspirator tube having a mouth opening in a portion of the first enclosed volume of the trap upstream of the means producing the pressure drop, wherein compressed air flows past the mouth of the aspirator tube due to the pressure drop and aspirates air from the second enclosed volume to develop a negative pressure in the second enclosed volume, the negative pressure in the second enclosed volume drawing liquid from the first enclosed volume into the second enclosed volume through the means coupling the second enclosed volume to the first enclosed volume.

2. In a trap of claim 1, wherein the aspirator tube is mounted within said drain means to extend from the second enclosed volume through the connecting means into the first enclosed volume.

3. A trap for removing vapor from a compressed air line and collecting the liquid which forms from the vapor, comprising:
   (a) inlet means for coupling to the compressed air line and outlet means for coupling to the compressed air line;
   (b) vapor removing means including a housing means coupled in series between the inlet and outlet means for removing the vapor from the compressed air flowing therethrough wherein the vapor changes into liquid;
   (c) a sump formed in a lower portion of the trap beneath the vapor removing means wherein the liquid flows into the sump from the vapor removing means; and wherein there is means to produce a pressure drop across the sump;
   (d) a drain having a reservoir for collecting the liquid;
   (e) means for connecting the drain's reservoir to the sump; and
   (f) an aspirator tube extending from the drain's reservoir into the sump and having a first open end upstream of the means producing the pressure drop and past which compressed air flows due to the pressure drop; and a second open end opening into the drain's reservoir, the compressed air flowing past the first open end of the aspirator tube creating a lower pressure at the open end of the aspirator tube then in the reservoir to aspirate air from the drain's reservoir through the aspirator tube and developing a negative pressure within the drain's reservoir to draw liquid from the sump into the drain's reservoir through the connecting means.

4. The trap of claim 3 wherein the trap's sump has a port in the bottom thereof, the drain's reservoir has a port in an an upper portion thereof, the connecting means comprising a hollow fitting having opposed ends received in the port in the trap's sump and the port in the drain's reservoir, respectively.

5. The trap of claim 4 wherein the aspirator tube is mounted to the drain to extend from the drain's reservoir through the hollow fitting and the sump into the portion of the trap through which compressed air is flowing.

6. The trap of claim 5 wherein the drain's reservoir comprises a bowl opening upwardly toward the trap, the upper portion of the drain's reservoir which has the port comprising a cover for covering the bowl's opening, the cover having the port for the drain's reservoir formed therein and extending therethrough, the port for the drain reservoir and the port for the trap's sump being internally threaded and the hollow fitting having opposed ends which are externally threaded, the opposed ends of the hollow fitting threadably secured in the threaded ports for the drain's reservoir and the trap'sump, respectively.

7. A drain in combination with an in-line trap means which removes vapor from a compressed air line, the trap means having an inlet, an outlet and a lower portion in which is formed a sump where liquid collects and wherein the trap means has means to produce a pressure drop across the trap means between its inlet and outlet, the sump having a port in a bottom thereof, the drain comprising:
   (a) a reservoir means for collecting liquid from the sump, the reservoir means having a top wall with a port extending therethrough, means coupling the port in the top wall of the reservoir means to the port in the trap's sump; and
   (b) an aspirator tube means for coupling the drain's reservoir means to a portion of the trap upstream of the means producing the pressure drop, whereby compressed air flowing past a mouth of the aspirator tube means due to the pressure drop creates a lower pressure at the mouth of the aspirator than a pressure in the reservoir means to aspirate air from the reservoir means through the aspirator tube means into the trap to develop a negative pressure in the reservoir means to draw liquid from the trap's sump through the means for coupling the port in the top of the reservoir means to the port in the trap's sump.

8. The drain in combination with an in - line trap means of claim 7 wherein the means for coupling the port in the top of the drain's reservoir means to the port in the trap's sump comprises a hollow fitting having opposed ends received in the port of the trap's sump and the port in the top of the drain's reservoir means, respectively, the aspirator tube means mounted to the drain to extend from the drain's reservoir means through the hollow fitting and through the trap's sump so that the mouth of the aspirator tube means opens into a portion of the trap adjacent the sump.

* * * * *